United States Patent Office 3,679,581
Patented July 25, 1972

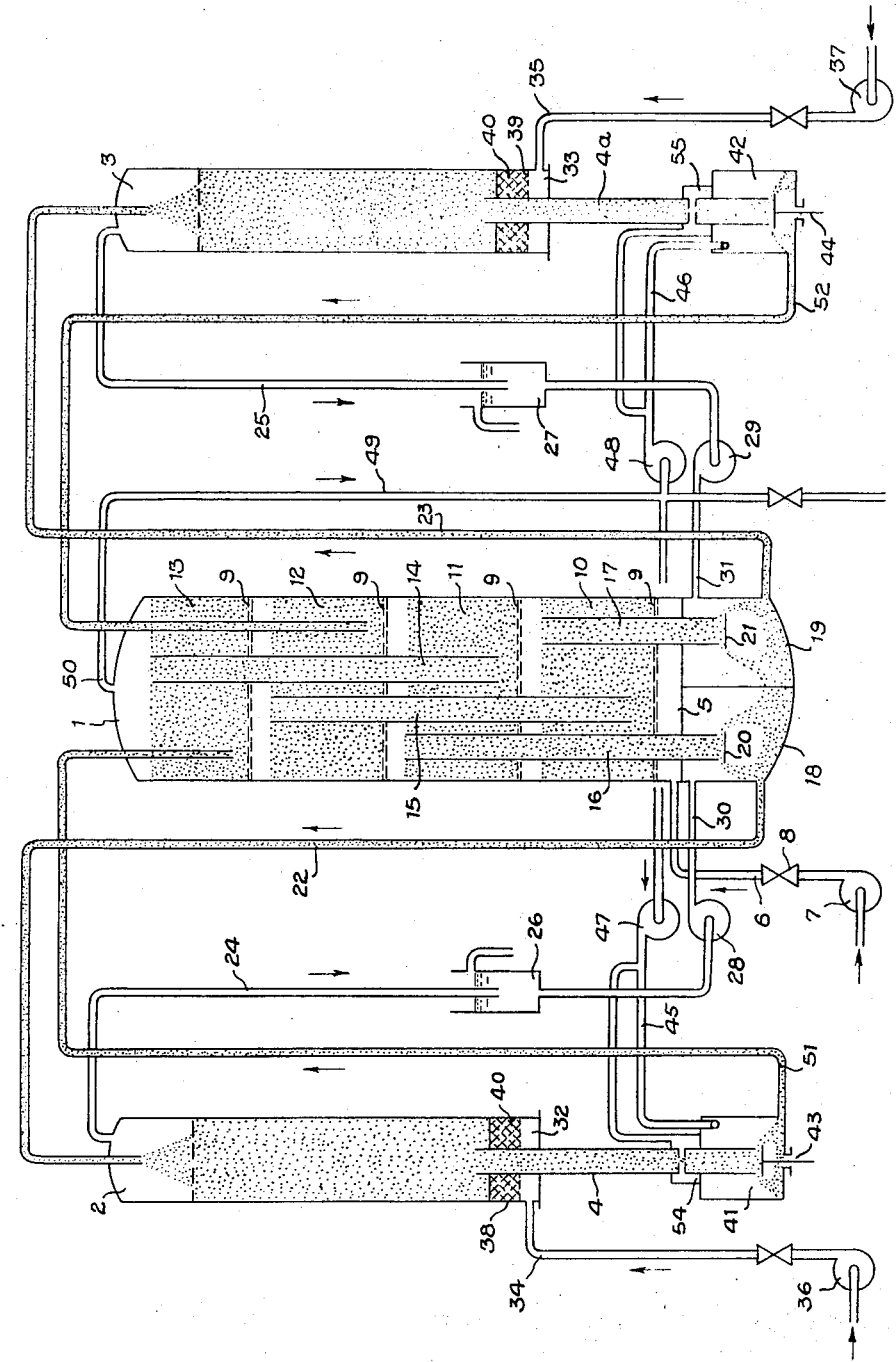

3,679,581
METHOD AND APPARATUS FOR SOFTENING OR DESALTING WATER BY ION EXCHANGE
Gerhard K. Kunz, Guystavsburg, Germany, assignor to GHH-M.A.N. Technik Gesellschaft für Anlagenbau m.b.H., Essen (Ruhr), Germany
Filed Apr. 15, 1970, Ser. No. 28,672
Int. Cl. B01d 15/06; B01j 1/06
U.S. Cl. 210—33
8 Claims

ABSTRACT OF THE DISCLOSURE

In an ion exchange apparatus and method for the softening and/or desalting of water by countercurrent flow, an ion exchange column, containing alternately cation exchange material and anion exchange material, is provided with a pair of regenerating columns being connected to said exchange column, with one receiving spent cation material and the other spent anion material, and a washing column connected to each regeneration column and to the exchange column so that upon the regeneration and washing of the cation and anion exchange materials, each will be passed to their respective zone.

---

The present application constitutes an improvement over the invention set forth in my co-pending application Ser. No. 706,107, filed Feb. 16, 1968, now U.S. Pat. No. 3,554,376.

The present invention relates to a method for the softening and/or desalting of water utilizing an ion exchange material and the subsequent regeneration of the exchange material employed therein. The ion exchange material is passed in countercurrent flow to the water to be treated until the exchange material is loaded, after which the spent material is regenerated, washed, and after a pre-treatment, returned for re-use. The charging of the exchange material, its subsequent regeneration and the washing of the exchange material are carried out in a fluid bed (swirl layers). In addition, a portion of the regeneration medium carrying a portion of the used exchange material is passed in a circulatory manner to a regeneration column. Moreover, the regenerated ion exchange material is washed in a washing column with a portion of the pure water that is passed in the system, after which the washed exchange material is passed from the washing column through a chamber having counter-pressure imposed therein and into an exchange column. The medium employed for the regeneration of the spent exchange material is introduced continuously in countercurrent flow to the exchange material in the manner set forth in German Pat. No. 1,280,761.

In order to employ the method of this invention for the complete desalting of an aqueous solution, at least two exchange columns are to be connected in series with the above described circulatory systems. However, it has been found that as the ion exchange proceeds in the first exchange column, an increasing counter ion effect from the bottom to the top is observed. During the exchange of metal ions, such as, for example, Ca, Mg, Na, K, against hydrogen ions, the aqueous solution becomes increasingly sour or acid. The H-ions, which are being released, cause the balance of the ion exchange material to shift in a direction which is unfavorable for the exchange, which means that the degree of effectiveness of the exchange is therefore sinking. On the other hand, it is obvious that the degree of effectiveness of exchange has to rise when the solution is neutral, which means if, at the same time, the exchange of the anions is effected, for example, $SO_4$, $Cl$, $CO_3$, $HCO_3$ through $OH$, there is a neutralization of the H-ions.

It is therefore the primary object of the present invention, and for which patent protection is sought, to improve the method and the apparatus of the hereinbefore described type so that a greater degree of effectiveness in the desalting of liquid using such a process may be achieved. This problem is solved in accordance with the present invention by having the water which is to be desalted in the ion exchange column alternately fed through chambers that are filled with a mass of ion exchange material containing cations and anions.

Through a further development of this method, it has been found that the counter ion effect can only become effective in relatively small steps or levels of the subdivisions of the exchange column since the anion exchange always occurs immediately following a cation exchange, and thus the water which becomes sour or acid by means of the cation exchange will become subsequently neutral again. Moreover, it is also possible to maintain a continuous operation of the process of complete desalting without having the disadvantages which are known from the mixed bed technique being present.

In the development of the present method, it should be noted that the cation and anion exchange materials are rotated or turned over in each circulatory system of regeneration. It is also advantageous for the carrying out of the method of the present invention to provide the exchange column with inserted bottom portions which are permeable for the water but not for the mass of exchange material. It has also been found desirable to have the various stages of levels, which are formed by such bottom portions, alternately connected with one another by means of pipe lines. This construction, in other words, means that in each case all stages of cation exchange material, and in the same manner, all stages of the anion exchange material, are connected with one another in series by means of pipe lines.

An example of the apparatus of the invention is illustrated in detail in the attached drawing.

As shown in the drawing, the apparatus includes an exchange column 1 for the complete desalting of the raw water, two regenerating columns 2 and 3 for the ion exchange material, and two washing columns 4 and 4a for the washing of the mass of exchange material.

At the lower portion of the exchange column 1 a tightly sealed intermediate bottom plate is provided therein above which the raw water feed line 6 is connected to the jacket of the exchange column 1. The raw water, which means the water which is to be treated, is pumped by pump 7 through line 6 and can be regulated by means of a valve 8. Above the end of the raw water feed line 6 a series of perforated plates 9 are spaced within the column 1 at regular intervals, one from the other. The distance between two such perforated "bottoms" results in one exchange column. The individual stages 10, 11, 12 and 13, while leaving out the adjacent stages, are connected with one another by means of pipes 14, 15 and 16. Pipes 16 and 17 lead from the lowermost stages 10 and 11 into counter-pressure chambers 18 and 19, which are situated at the foot of the column and which are also blocked off by adjustable plates 20 and 21.

Lines 22 and 23 pass from the chambers 18 and 19 of the counter-pressure columns to the upper ends of the regenerating columns 2 and 3. Lines 24 and 25 respectively branch off from the upper end of the regenerating columns 2 and 3 and extend to pumps 28 and 29 respectively, with spill-over vessels 26 and 27 being inserted between the respective jointure of the lines with the regeneration columns 2 and 3 and the pumps 28 and 29. The used and any overflow amount of the regenerating medium solution is forced by the pumps through lines 30 and 31 respectively into the counter-pressure chambers 18 and 19. The regenerating columns 2 and 3 are provided with bottom portions 32 and 33 respectively at their lower ends through which they are connected with the washing columns 4 and 4a, which are smaller in diameter than the regenerating columns. The solution of regenerating medium is fed through the supply lines 34 and 35 into the regenerating columns after the regenerating medium has been brought by the pumps 36 and 37 from a storage container. Since the anions as well as the cations which are present in the raw water have to be replaced by OH and H-ions respectively, it is necessary that two different columns of regenerating medium be employed for the two circulatory systems.

A solution of caustic soda is pumped through line 34 and a solution of sulfuric acid pumped through line 35 into the respective regeneration columns. Above the supply end for each of the solutions of the regenerating medium, perforated plates or distribution devices 38 and 39 respectively are positioned in each regeneration column and filter elements 40 in layers are placed thereon for the further distribution of the solution of the regenerating medium. The height of the layer of filter elements 40 reaches up to the upper edge of the washing columns 4 or 4a. The lower portions of the washing columns 4 and 4a project into the counter-pressure chambers 41 and 42 respectively, which washing columns can be either opened or closed with the aid of adjustable plates 43 and 44 respectively. Water from the pure water line is forced as counter-pressure liquid into the counter-pressure chambers 41 and 42 by means of lines 45 and 46, with each being provided with auxiliary pumps 47 and 48 respectively. The pure water line 49 branches off at the head 50 of the exchange column. Annular chambers 54 and 55 are found above hte counter-pressure chambers 42 and 43 and the washing liquid leaves the annular chambers and is injected into the washing columns 4 and 4a by means of annular nozzles, which are not shown in the drawing. This washing liquid originates from the lines 45 and 46. Supply lines 51 and 52 pass from the counter-pressure chambers 41 and 42 in solid and tight connection through the head of the exchange column 1 and extend into the stages 12 and 13 respectively of the exchange column 1.

The method of operation of the process in accordance with the present invention is as follows:

The raw water to be cleaned is pumped through the raw water supply line 6 into the exchange column 1 above the perforated bottom portions 9 and rises slowly upwardly to the head 50 of the exchange column 1. The raw water passes during this rise through stages 10 and 12 in which the cations of the raw water, mainly Ca, Mg, K and Na ions, are replaced by H-ions. The raw water is also freed from its anions in the intermediate stages 11 and 13, which are, in the main Cl, $SO_4$, $CO_3$ and $HCO_3$ ions, in the same manner that such ions are replaced by OH ions. The cleaned raw water leaves the exchange column by means of line 49 in a completely desalted condition, and can be removed from same. Portions of the pure water are taken by pumps 47 and 48 and pumped into the counter-pressure chambers 41 and 42 respectively. The regenerated mass of exchange material passes downwardly from the washing columns, while the pure water flows from the bottom upwardly, and the respective masses moved by way of lines 51 or 52 into their respective stages of the exchange column 1. The masses of ion exchange material form layers of swirling masses or fluids in the exchange column. The ion exchange media which remain separate and apart move by way of spillover pipes 14, 15, 16 and 17 of column 1 into the counter-pressure chambers 18 and 19 at the bottom of the exchange column. At this point, the masses of ion exchange material are passed to the regenerating columns 2 and 3 by way of lines 22 and 23. The ion exchange material passes through a solution of regenerating medium in each regenerating column, from which the solution is forced by way of lines 24 and 25 with the aid of pumps 28 and 29 into the counter-pressure chambers 18 and 19. The masses of exchange material in the regenerating columns 2 and 3 sink to the bottom and are thereby regenerated again by means of the solution of regenerating medium which comes out of lines 34 and 35.

The metal ions in the regenerating columns are replaced by the hydrogen ions which come from the sulfuric acid, while the residual ions of the soda are replaced by the OH ions of the caustic soda.

I claim:

1. A process for the softening or desalting of water by ion exchange on a continuous basis comprising continuously passing raw water as the feedstock in a countercurrent relationship through separate alternate zones of cation exchange material and anion exchange material present in a contacting area, continuously drawing substantially pure water from said contacting area, continuously collecting the spent cation exchange material and the spent anion exchange material respectively in separate counter-pressure zones, continuously passing the spent cation exchange material and the spent anion exchange material from the respective counter-pressure zones to separate regenerating zones, continuously passing basic and acidic regenerating solutions through the anion and cation exchange material containing regeneration zones respectively in countercurrent relationship thereto to effect a regeneration of each of the separate spent ion exchange materials, continuously washing each of the separate regenerated ion exchange materials in separate washing zones, and continuously passing the washed and regenerated cation and anion exchange materials to their respective alternate zones in said contacting zone for re-use thereof.

2. A method in accordance with claim 1 wherein each of the regenerated anion and cation exchange materials passes from its respective washing zones into a separate counter-pressure zone adjacent its respective washing zone.

3. A method in accordance with claim 1 wherein at least a portion of each of the spent acidic and basic regenerating solutions is passed to the respective cation and anion exchange material receiving counter-pressure zones.

4. A method in accordance with claim 2 wherein at least a portion of the collected pure water is passed to the counter-pressure zone adjacent each of said washing zones.

5. Apparatus for the ion exchange treatment of water to effect a softening or desalting thereof comprising a contacting column, a plurality of bottom members spaced from one another within said contacting column for dividing same into alternate anion and cation exchange material receiving zones within said column, first pipe means connecting said formed alternate anion exchange material receiving zones of said contacting column with one another, second pipe means connecting said formed alternate cation exchange material receiving zones of said contacting column with one another, means in the bottom of said contacting column for dividing same into two separate counter-pressure zones, one of said counter pressure zones connected to the anion exchange material receiving zones and the other of said counter-pressure zones connected to the cation exchange material receiving zones, an anion exchange material regenerating column connected to the counter-pressure zone that is connected to the anion exchange material receiving zones for effecting the regeneration of spent anion exchange material therein, means for passing a basic regenerating solution to said anion exchange material regenerating column, a cation exchange material regenerating column connected to the counter-pressure zone that is connected to the cation exchange material receiving zones for effecting the regeneration of spent cation exchange material therein, means for passing an acidic regenerating solution to said cation exchange material regenerating column, a first washing column connected adjacent one end to said anion exchange material regenerating column and connected adjacent the other end to one of said anion exchange material receiving zones of said contacting column, a second washing column connected adjacent one end to said cation exchange material regenerating column and connected adjacent the other end to one of said cation exchange material receiving zones of said contacting column, and means for passing impure water to be treated into said contacting column for treatment therein and means for passing treated, substantially pure water from said contacting column.

6. Apparatus in accordance with claim 5 wherein means are provided for passing at least a portion of the basic and acidic regenerating solutions from the respective anion and cation exchange material regenerating columns to the respective anion and cation counter-pressure zones of said contacting column.

7. Apparatus in accordance with claim 5 wherein each of said washing columns is provided with a counter-pressure zone.

8. Apparatus in accordance with claim 7 wherein means are provided for passing at least a portion of the treated pure water obtained from the contacting column back to the counter-pressure zone of each of said washing columns.

References Cited

UNITED STATES PATENTS

| | | | |
|---|---|---|---|
| 3,193,498 | 7/1965 | Platzer et al. | 210—189 X |
| 3,136,719 | 6/1964 | Serra | 210—284 X |
| 3,152,072 | 10/1964 | Yomiyama et al. | 210—33 |
| 3,554,376 | 1/1971 | Kunz | 210—189 |
| 2,767,140 | 10/1956 | Fitch | 210—33 |
| 3,239,063 | 3/1966 | Lamkin | 210—284 X |

REUBEN FRIEDMAN, Primary Examiner

T. G. WYSE, Assistant Examiner

U.S. Cl. X.R.

210—189, 268, 284